United States Patent [19]
Cooper

[11] Patent Number: 5,636,890
[45] Date of Patent: Jun. 10, 1997

[54] VEHICULAR STORAGE COMPARTMENT AND METHOD OF RETROFITTING A VEHICLE WITH A STORAGE COMPARTMENT

[76] Inventor: Johnny G. Cooper, 6096 Atlas Rd., Grand Blanc, Mich. 48439

[21] Appl. No.: 588,998

[22] Filed: Jan. 19, 1996

[51] Int. Cl.⁶ ........................................................ B60R 5/04
[52] U.S. Cl. ........................ 296/37.1; 29/401.1; 296/37.14
[58] Field of Search .................................... 296/37.1, 37.2, 296/37.14, 37.16, 195, 191, 29; 29/401.1

[56] References Cited

U.S. PATENT DOCUMENTS

| | | | |
|---|---|---|---|
| 1,554,413 | 9/1925 | Coppage | 296/37.14 |
| 1,597,569 | 8/1926 | Barringer | |
| 2,848,273 | 8/1958 | Diaz | 296/65 |
| 3,287,058 | 11/1966 | Wells | 296/37 |
| 3,291,520 | 12/1966 | Smith | 296/24 |
| 3,325,207 | 6/1967 | Anderson et al. | 296/37 |
| 3,764,048 | 10/1973 | Gore | 224/42.41 |
| 4,522,442 | 6/1985 | Takenaka | 296/37.1 |
| 4,550,946 | 11/1985 | Hanemaayer | 296/156 |
| 4,620,741 | 11/1986 | Hanemaayer | 296/37.14 |
| 4,728,144 | 3/1988 | Crean | 296/168 |
| 4,733,898 | 3/1988 | Williams | 296/24 R |
| 4,738,480 | 4/1988 | Ward | 296/24 R |
| 4,915,437 | 4/1990 | Cherry | 296/37.6 |
| 5,002,325 | 3/1991 | Fought et al. | 296/37.14 |
| 5,061,002 | 10/1991 | Saso | 296/37.3 |
| 5,080,250 | 1/1992 | Dickinson et al. | 296/37.6 X |
| 5,080,417 | 1/1992 | Kanai | 296/37.14 X |
| 5,188,414 | 2/1993 | Burnham et al. | 296/37.6 |
| 5,188,418 | 2/1993 | Walworth, Jr. et al. | 296/191 X |
| 5,257,846 | 11/1993 | Kanai et al. | 296/37.14 |
| 5,441,183 | 8/1995 | Frenzel | 224/542 |
| 5,458,353 | 10/1995 | Hanemaayer | 280/164.1 |

FOREIGN PATENT DOCUMENTS

| | | | |
|---|---|---|---|
| 002662404 | 11/1991 | France . | |
| 146421 | 7/1931 | Germany | 296/37.14 |
| 0034835 | 2/1987 | Japan | 296/194 |
| 2-164633 | 6/1990 | Japan . | |
| 5-105000 | 4/1993 | Japan . | |

*Primary Examiner*—David M. Mitchell
*Assistant Examiner*—Kia M. Robinson
*Attorney, Agent, or Firm*—Harness, Dickey & Pierce, P.L.C.

[57] ABSTRACT

A vehicular storage compartment is provided for mounting in an opening in a floor of a vehicle. The vehicular storage compartment includes a tub-shaped container having a plurality of side walls and a base portion interconnecting the plurality of side walls at a bottom portion thereof. The plurality of side walls of the tub-shaped container define an open end at a top portion thereof wherein an outwardly extending flange portion is disposed around a circumference of the open end. A lid is attached to the open end of the tub-shaped container. The tub-shaped container is adapted to be inserted in the opening in the floor of the vehicle such that the flange portion rests above the floor of the vehicle adjacent to the opening.

13 Claims, 2 Drawing Sheets

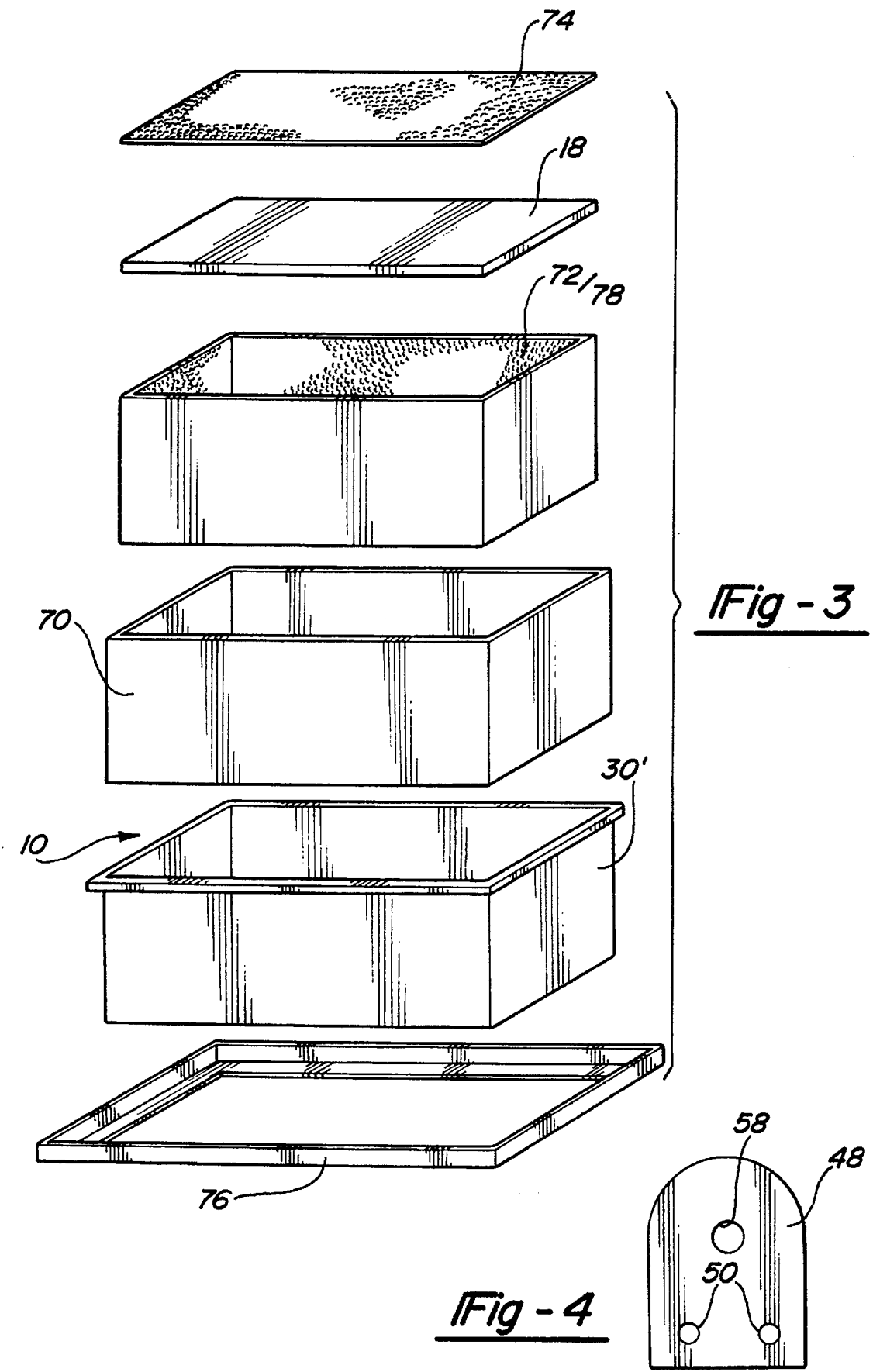

VEHICULAR STORAGE COMPARTMENT AND METHOD OF RETROFITTING A VEHICLE WITH A STORAGE COMPARTMENT

BACKGROUND OF THE INVENTION

1. Field of the Invention

The present invention relates generally to vehicle storage compartments and, more specifically, to a vehicular storage compartment for mounting in an opening in a floor of a vehicle.

2. Description of Background Art

There are generally known luggage and storage spaces that are provided beneath a vehicle floor. One example of a vehicle having a rear cargo space beneath the floor is disclosed in U.S. Pat. No. 3,325,207 issued to Andersen et at on Jun. 13, 1967. In the disclosure of U.S. Pat. No. 3,325,207 a hidden cargo storage area is designed into the body of the vehicle and is provided with a pivoting floor section which covers the hidden cargo storage area. The hidden cargo storage area is designed to accommodate a wheel and other cargo. A problem with the hidden cargo storage area disclosed in U.S. Pat. No. 3,325,207 is that the cargo area is integrally designed into the vehicle body and it does not disclose how to retrofit a vehicle body with a storage compartment.

Similarly, U.S. Pat. No. 5,257,846 issued to Kanai et al on Nov. 2, 1993 discloses a luggage space which is located behind a rear seat of a station wagon type motor vehicle. The disclosed luggage space of the '846 patent also suffers from the drawback that the invention does not disclose a method of retrofitting a vehicle with a storage compartment.

In many vehicles it is desirable to provide additional storage space for the purpose of storing items. For automotive vehicles such as cars, the vehicle trunk is often utilized as a place where tools, tool boxes, jumper cables, recreational equipment and other miscellaneous items are stored. Likewise, in vehicles such as station wagons and suburbans are sometimes designed with a storage compartment under their floor as disclosed in U.S. Pat. Nos. 3,325,207 and 5,257,846 discussed above.

However, in other vehicles where a convenient storage compartment is not designed into the vehicle, the transport of such items as tools, tool boxes, jumper cables, recreational and other miscellaneous items can be cumbersome. In particular, in vehicles that are designed without a convenient storage compartment, these items are placed on the floor or on the seats and there is nothing to keep the items from rolling around on the vehicle floor or seats. Accordingly, it is desirable in the art to provide a vehicular storage compartment for containing such items which can be retrofitted in a floor of an automotive vehicle.

SUMMARY OF THE INVENTION

It is an object of the present invention to provide a vehicular storage compartment which can be retrofitted beneath the floor of a vehicle.

It is another object of the present invention to provide a method of retrofitting a vehicular storage compartment in a floor of an automotive vehicle.

It is a further object of the present invention to provide a vehicular storage compartment which is simple in structure.

It is yet another object of the present invention to provide a vehicular storage compartment that is inexpensive to manufacture.

It is still another object of the present invention to provide a vehicular storage compartment that is easy to mass produce, durable in use, refined in appearance and easy to assemble and install.

These and other objects of the present invention are obtained by providing a vehicular storage compartment for mounting in an opening in a floor of a vehicle, comprising a tub-shaped container including a plurality of side walls and a base portion interconnecting the plurality of side walls at a bottom portion thereof, the plurality of side walls defining an open end at a top portion thereof wherein an outwardly extending flange portion is disposed around a circumference of the opening; and a lid attached to the open end of the tub-shaped container; wherein the tub-shaped container is adapted to be inserted in the opening in the floor of the vehicle such that the flange portion rests above the floor of the vehicle adjacent to the opening.

The objects of the present invention are also obtained by providing a method of retrofitting a vehicular storage compartment in a floor of an automotive vehicle, comprising the steps of: cutting an opening in the floor of the automotive vehicle; providing a tub-shaped container including a plurality of side walls and a base portion interconnecting the plurality of side walls at a bottom portion thereof, the plurality of side walls defining an open end at a top portion thereof wherein an outwardly extending flange portion is disposed around a circumference of the opening; pivotally mounting a lid to the tub-shaped container; inserting the tub-shaped container in the opening in the floor such that the flange portion of the tub-shaped container rests above the floor of the vehicle; providing a seal around a circumference of the opening between the flange portion and the floor; and fastening the flange portion of the tub-shaped container to the floor of the automotive vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only and thus are not limitative of the present invention, and wherein:

FIG. 3 is a schematic view of a vehicular storage compartment assembly according to a second embodiment of the present invention; and FIG. 4 is a side view of the hinge plates which are provided for supporting a lid of the vehicular storage compartment according to the principles of the present invention.

DETAILED DESCRIPTION OF THE PREFERRED EMBODIMENTS

Figure 1:
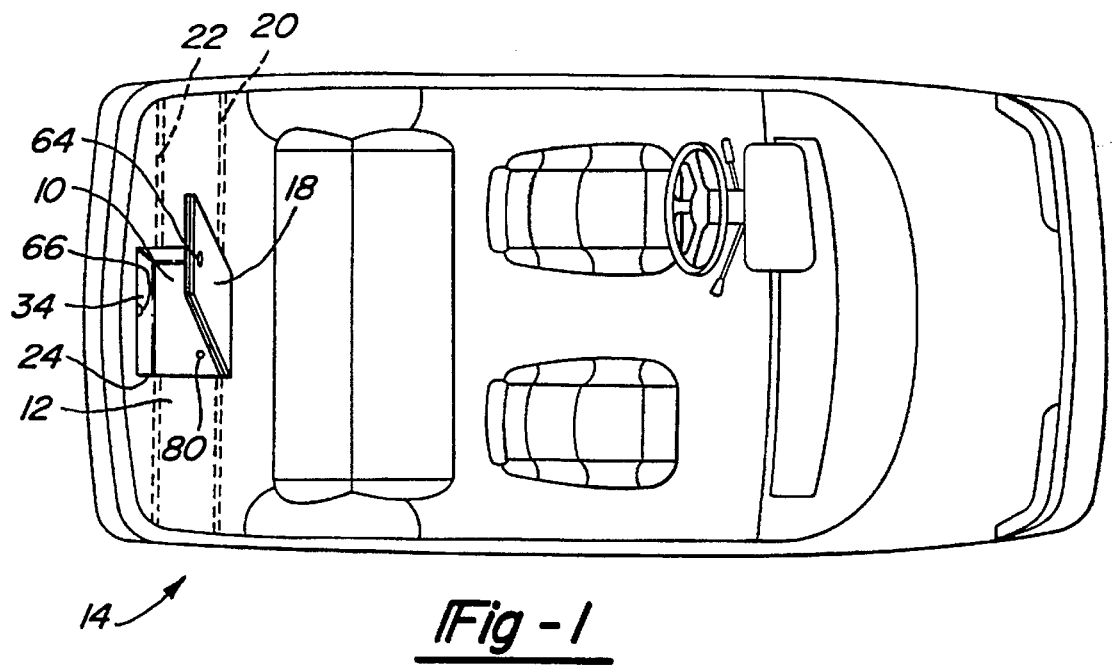
FIG. 1 is a plan view of a storage compartment which is retrofitted in the rear of the floor of a van-type vehicle according to the principles of the present invention.

The present invention relates to a vehicular storage compartment 10 shown in FIG. 1 incorporated into the floor 12 in the rear of a van-type vehicle 14. The vehicle 14 shown includes rear doors, not shown.

The vehicular storage compartment 10 is provided with a lid member 18 which is hingedly attached to the vehicular storage compartment 10. The floor 12 of the vehicle 14 is generally provided with a plurality of structural frame members 20, 22 which are disposed below the floor 12 and provide structural strength to the body of the vehicle 14. In order to retrofit the vehicle 14 with the storage compartment 10, an opening 24 is cut in the steel floor 12, preferably between the frame members 20, 22. The vehicular storage compartment 10 is then inserted in the cut out opening 24 in a manner which will be described in greater detail hereinafter.

Figure 2:
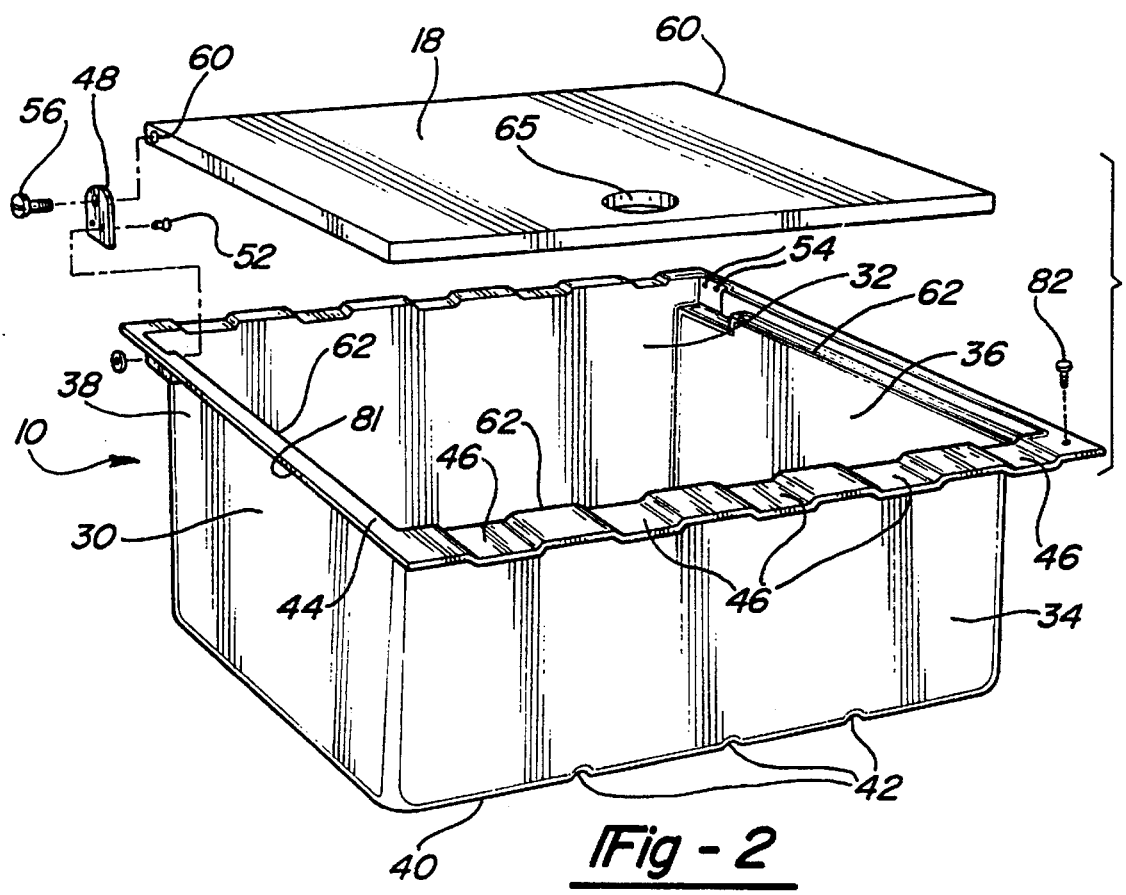
FIG. 2 is a perspective exploded view of the vehicular storage compartment according to a first embodiment of the present invention.

With reference to FIG. 2, the vehicular storage compartment 10 includes a tub-shaped container 30. The tub-shaped container 30 includes a front wall 32, a rear wall 34 and first and second side walls 36, 38 respectively. A base portion 40 interconnects the bottoms of each of the walls 32, 34, 36 and 38. The base portion 40 is optionally provided with a plurality of strengthening ribs 42 which extend from the front wall 32 to the rear wall 34.

The upper portions of the walls 32, 34, 36 and 38 are provided with a flange portion 44. Along the front and rear walls 32, 34, the flange portion 44 is provided with a plurality of grooves or notches 46 designed for mating with corresponding strengthening ribs, not shown, in the floor 12 of the vehicle 14. The tub-shaped container 30 is made of plastic which may be injection molded, vacuum formed, or molded by any other known method. A preferred plastic material is nylon 6/6 with 10 percent fiberglass reinforcement.

The lid member 18 is pivotally connected to the tub-shaped container 30 by hinge plates 48. The hinge plates 48 as best shown in FIG. 4, are provided with a pair of mounting holes 50 which receive bolts or rivets 52 therethrough for fastening hinge plate 48 to the top of the side walls 36, 38 adjacent to front wall 32. The bolts 52 are secured in mounting holes 54.

Pivoting screws 56 are inserted through the pivot hole 58 of hinge plates 48 and are screwed into the lid member 18 at locations 60. In the closed position, the lid member 18 rests on ledge portions 62 of first and second sidewalls 36, 38 and rear wall 34. The ledge portions 62 are provided inward from and below the upper surface of the flange 44 so that the top surface of the lid member 18 is flush with the top surface of the flange 44 when the lid member 18 is in a closed position. The lid member 18 may be formed of wood or plastic material and is preferably strong enough to support a substantial amount of weight.

The lid member 18 is provided with a latch mechanism 64, at location 65, which latches with corresponding hook element 66 which is located near the center of the top of rear wall 34, as shown in FIG. 1. The latch mechanism 64 can optionally be provided with a lock in order to safely store valuable items in the vehicular storage compartment 10.

According to a second embodiment of the present invention, the vehicular storage compartment 10 can be provided with soundproof insulation 70 and internal carpeting 72 on the sidewalls and bottom of the tub-shaped container 30', as shown in FIG. 3. It is also anticipated that the lid member 18 can be covered with carpeting 74 on an upper surface thereof in order to match the carpet on the floor 12 of the vehicle 14. Alternatively, the lid may be wrapped in fabric or another insulating or decorative material. Additionally, a frame 76 can be utilized in the cut out opening 24 of the vehicle floor 12. As an additional option, the tub-shaped container 30' can be provided with an insulation layer 70 and a plastic lining 78 so that the vehicular storage compartment 10 can be utilized as a cooler for storing food and beverages. When the vehicle storage compartment 10 is used as a cooler, as discussed above, a plug-type drain such as that designated by reference numeral 80 in FIG. 1, may also be provided.

The method of retrofitting the vehicular storage compartment 10 in a floor 12 of an automotive vehicle 14 will now be described. First, an opening 24 is cut out in the ribbed floor 12 of the vehicle 14. The opening 24 is preferably disposed between structural frame members 20, 22 which are provided beneath the floor 12, although it may be necessary to cut through one of the members. The vehicular storage compartment 10 is preassembled so that the lid member 18 is pivotally attached to the tub-shaped container 30 by hinge plates 48. A bead of weather-proof caulking or a rubber seal 81 is provided around a circumference of the opening in the floor or is disposed on the underside of the flange portion 44 of the tub-shaped container 30. The tub-shaped container 30 is then inserted in the cutout opening 24 in the floor 12 such that the flange portion 44 of the tub-shaped container is provided in a sealed relationship with respect to the floor 12 of the vehicle 14. A plurality of fasteners 82 are then inserted through the flange portion 44 and into the floor 12 of the vehicle 14 to hold the vehicular storage compartment 10 in place. The fasteners 82 are preferably self-tapping screws.

Carpeting on the floor 12 may cover the flange portion 44 of the tub-shaped container 30. The tub-shaped container 30 can also be sprayed with an undercoating for sound deadening and road noise reduction. In addition, the carpeting 72 and insulation 70 on the inside of the tub-shaped container also cushions the internal walls of the tub-shaped container 30 to thereby reduce noise created by objects placed in the storage compartment 10.

With respect to the second embodiment shown in FIG. 3, it is submitted that the installation of the storage compartment 30' would be similar to that described above, with the exception that the framework 76 would be fastened to the floor 12 of the vehicle 14 and the tub-shaped container 30' would be fastened to the framework 76.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A vehicular storage compartment for mounting in an opening in a floor of a vehicle, comprising:

a plastic tub-shaped container including a plurality of side walls and a base portion interconnecting said plurality of side walls at a bottom portion thereof, said plurality of side walls defining an open end at a top portion thereof wherein an outwardly extending flange portion is disposed around a circumference of said opening, said flange portion being provided with a plurality of grooves designed for mating with corresponding grooves in said floor of said vehicle; and a lid attached to said open end of said tub-shaped container;

wherein said tub-shaped container is adapted to be inserted in said opening in said floor of said vehicle such that said flange portion rests above said floor of said vehicle adjacent to said opening, and wherein said tub-shaped container includes a ledge portion, adjacent to said open end of said tub-shaped container and recessed below said flange portion, upon which said lid rests when said lid is in a closed position.

2. The vehicular storage compartment according to claim 1, further comprising a pair of hinge plates fastened to said open end of said tub-shaped container and each supporting a pivot member for supporting said lid.

3. The vehicular storage compartment according to claim 1, wherein said base of said tub-shaped container is provided with a plurality of ribs.

4. The vehicular storage compartment according to claim 1, further comprising a layer of insulating material lining said tub-shaped container.

5. The vehicular storage compartment according to claim 1, further comprising a drain plug in said base portion of said tub-shaped container.

6. The vehicular storage compartment according to claim 1, further comprising a frame for receiving said flange portion of said tub-shaped container, said frame being adapted to be mounted adjacent to said opening in said floor of said vehicle.

7. An automotive vehicle having a storage compartment in a floor thereof, comprising:
a vehicle body having a metal floor surface with a cutout portion;
a plastic tub-shaped container including a plurality of side walls and a base portion interconnecting said plurality of side walls at a bottom portion thereof, said plurality of side walls defining an open end at a top portion thereof wherein an outwardly extending flange portion is disposed around a circumference of said opening, said flange portion being provided with a plurality of grooves designed for mating with corresponding grooves in said floor of said vehicle; and
a lid attached to said open end of tub-shaped container;
wherein said tub-shaped container is adapted to be inserted in said cutout portion in said metal floor surface of said vehicle body such that said flange portion rests above said metal floor surface of said vehicle adjacent to said cutout portion, and wherein said tub-shaped container includes a ledge portion, adjacent to said open end of said tub-shaped container and recessed below said flange portion, upon which said lid rests when said lid is in a closed position.

8. The automotive vehicle and storage compartment according to claim 7, further comprising a pair of hinge plates fastened to said open end of said tub-shaped container and each supporting a pivot member for supporting said lid.

9. The automotive vehicle and storage compartment according to claim 7, wherein said base of said tub-shaped container is provided with a plurality of ribs.

10. The automotive vehicle and storage compartment according to claim 7, further comprising a layer of insulating material lining said tub-shaped container.

11. The automotive vehicle and storage compartment according to claim 7, further comprising a drain plug in said base portion of said tub-shaped container.

12. The automotive vehicle and storage compartment according to claim 7, further comprising a frame for receiving said flange portion of said tub-shaped container, said frame being adapted to be mounted adjacent to said opening in said floor of said vehicle.

13. A method of retrofitting a vehicular storage compartment in a floor of an automotive vehicle, comprising the steps of:
cutting an opening in said floor of said automotive vehicle;
providing a plastic tub-shaped container including a plurality of side walls and a base portion interconnecting said plurality of side walls at a bottom portion thereof, said plurality of side walls defining an open end at a top portion thereof wherein an outwardly extending flange portion is disposed around a circumference of said open end, said flange portion being provided with a plurality of grooves designed for mating with corresponding grooves in said floor of said vehicle;
pivotally mounting a lid to said tub-shaped container;
inserting said tub-shaped container in said opening in said floor such that said flange portion of said tub-shaped container rests above said floor; and
providing a seal around a circumference of said opening in said floor between said floor and said flange portion;
fastening said flange portion of said tub-shaped container to said floor of said automotive vehicle;
wherein said tub-shaped container includes a ledge portion, adjacent to said open end of said tub-shaped container and recessed below said flange portion, upon which said lid rests when said lid is in a closed position.

* * * * *